United States Patent [19]

Ezis

[11] Patent Number: 4,946,630
[45] Date of Patent: Aug. 7, 1990

[54] MAKING HOT PRESSED SILICON NITRIDE BY USE OF LOW DENSITY REACTION BONDED BODY

[75] Inventor: Andre Ezis, Grosse Ile, Mich.

[73] Assignee: Ceradyne, Inc., Costa Mesa, Calif.

[21] Appl. No.: 448,889

[22] PCT Filed: Oct. 12, 1982

[86] PCT No.: PCT/US82/01461
 § 371 Date: Oct. 12, 1982
 § 102(e) Date: Oct. 12, 1982

[51] Int. Cl.$^5$ ............................................. C04B 35/58
[52] U.S. Cl. ........................................ 264/65; 51/307; 51/309; 264/325; 264/332; 423/344; 501/97
[58] Field of Search ................... 264/65, 325, 332; 501/97; 423/344; 51/307, 309

[56] References Cited

U.S. PATENT DOCUMENTS

| | | | |
|---|---|---|---|
| 3,419,935 | 1/1969 | Pfeller | 264/332 |
| 3,469,976 | 9/1969 | Iler | 264/332 |
| 3,562,371 | 2/1971 | Bush | 264/332 |
| 3,839,540 | 10/1974 | Arrol | 501/97 |
| 3,839,541 | 10/1974 | Lumby et al. | 423/344 |
| 4,017,319 | 4/1977 | Greskovich et al. | 501/97 |
| 4,264,546 | 8/1981 | Becker | 264/332 |
| 4,331,772 | 5/1982 | Torre et al. | 423/344 |
| 4,346,147 | 8/1982 | Barlier | 264/65 |
| 4,377,542 | 3/1983 | Mangels | 264/332 |
| 4,477,402 | 10/1984 | Ezis | 264/332 |
| 4,489,032 | 12/1984 | Ezis et al. | 264/332 |
| 4,508,671 | 4/1985 | Ezis | 264/332 |

FOREIGN PATENT DOCUMENTS 0009859 4/1980 European Pat. Off. .............. 501/97

*Primary Examiner*—James Derrington
*Attorney, Agent, or Firm*—Leonard Tachner

[57] ABSTRACT

A method of making a silicon nitride comprising object by use of a low density reaction bonded body is disclosed. An uncompacted mixture of silicon powder and a fluxing agent is heated in a nitrogen atmosphere to react the mixture with the atmosphere to form a body consisting essentially of silicon nitride and having a dimension greater than and a density less than the finished product. The nitrided mixture is then hot pressed to produce a silicon nitride comprising object of desired dimension and density, which material is useful as a cutting tool material for machining metals.

12 Claims, No Drawings

MAKING HOT PRESSED SILICON NITRIDE BY USE OF LOW DENSITY REACTION BONDED BODY

BACKGROUND OF THE INVENTION AND PRIOR ART STATEMENT

This invention is directed to the art of making silicon nitride from silicon powder as a starting material. The powder is subjected to a reactive nitriding gas to form a mixed phase (alpha and beta) silicon nitride body, the body being then hot pressed. Within this art there are known two ways to agglomerate the powder materials: (a) by hot pressing as the last stage in the process, and (b) by cold compacting as an early stage in the process.

The prior art predominantly employs the first way. Agglomerating by hot pressing involves nitriding a loose supply of uncompacted silicon powder to form a cake of unconsolidated silicon nitride. The cake is broken up by primary and secondary reduction techniques to form a free powder supply of silicon nitride. The powder is then poured into a hot pressing assembly where it is agglomerated by heat and pressure. Unfortunately, the reduction techniques applied to the cake introduce contaminants to the silicon nitride powder. Such contaminants can form flaws within the final product. In addition, this powder technology often transfers an unreacted portion of powder ingredients directly into the hot pressing steps, requiring high hot pressing temperatures to bring about sintering under pressure.

The second way uses cold compacting as a step prior to the nitriding treatment. This results in a minimum green density for the material prior to nitriding of at least 1.1 gm/cm$^3$, and particularly 1.1-1.7 gm/cm$^3$ (which is approximately 53-85% of full silicon nitride theoretical). This is particularly illustrated in U.S. Pat. No. 3,839,540. The consolidation of the powder, by compacting, adversely affects nitriding by reducing the available pore network and associated exposed surface area. This must be undesirably countered by a greatly increased nitriding time to reduce incomplete nitriding. This in turn adversely affects the temperature of reaction within the material and the type of crystallographic structure formed as a result of nitriding. Without the right crystallographic structure, hot pressing requirements are aggravated if full density is to be achieved.

What is needed is a process which increases the gas phase formation of silicon nitride, dramatically cuts the amount of time required to carry out effective nitriding of a silicon mixture with its accompanying additives, reduces substantially the temperature requirements for hot pressing, and substantially reduces the possibility for flaws in the resulting hot pressed product.

SUMMARY OF THE INVENTION

The invention is a method of making a silicon nitride comprising object by the steps of first heating an uncompacted mixture of silicon powder and a fluxing agent for aiding the pressure sintering of the mixture, said mixture having an increased pore network to increase the inward migration of the atmosphere and having an increased surface area exposed to the atmosphere to decrease the nitriding diffusion distance. The heating is carried out in a nitrogen atmosphere, without the use of pressure normally associated with hot pressing, to fully and substantially react said mixture with said atmosphere to form a body consisting substantially of silicon nitride and having a dimension greater than the required finished product and a density less than the required finished product. Second, the nitrided mixture is hot pressed to produce a silicon nitride comprising object of desired dimension and density which material is useful as a cutting tool material for machining metals.

Preferably, the increased pore network is sufficient to increase the flow of gases through the mixture, carrying heat away, and thereby controlling the exothermic reaction of said atmosphere and mixture to favor the formation of alpha silicon nitride in an amount of at least 60% of said mixture. It is also preferable if the increased pore network is sufficient to compensate for internal volume expansion during nitriding without adversely affecting the increase in inward gas migration and nitriding diffusion distance. With an increase in gas phase alpha silicon nitride, formed during nitriding, hot pressing can preferably be carried out at a temperature no greater than 1650° C. and at reduced pressures, i.e., 2000–3000 psi.

With respect to the first step, it is preferable if the mixture is spread on a flat carrier plate with lips to prevent the powder from spilling off, the powder being distributed thereon to have a generally uniform height or thickness of about 1–2 inches. The thickness of the loose powder supply required to produce a given thickness for an end product will depend upon the particle size and particle size distribution of the silicon powder. The density of the loose powder is less than 1.0 g/cm$^3$.

Advantageously, the loose powder mixture is prepared by dry milling a mixture of silicon powder, Y$_2$O$_3$, and Al$_2$O$_3$, and then heating the mixture in a nitrogen atmosphere for a period of 80 hours or less and at a temperature to fully react the mixture to form a body having a density of between 0.65–1.85 gm/cm$^3$ (preferably 0.65–1.55 gm/cm$^3$) and a chemical content of alpha and beta phase silicon nitride, and certain silicon/yttrium oxynitrides. The oxygen carrying agents should be present in the mixture in a molar percent of silicon in the range of 0.4–2.4.

DETAILED DESCRIPTION

This invention has found that maximizing gas permeability, by decreasing the green density of the silicon powder mixture during nitriding, offers the following advantages:

(a) there will be an increased pore network which facilitates more effective nitriding by assisting the inward migration of the nitriding gas mixture, decreasing the diffusion distance the gas atmosphere must penetrate to obtain full chemical reaction within the core of the powder particles, and by providing space for internal volume expansion during heating so as not to inhibit the above effects;

(b) there will be an increased pore network which facilitates the formation of a more desirable crystallographic structure as a result of nitriding by lowering the rate of exothermic reaction through increased gas flow (which reduces the thermal gradient within the powder supply by conducting heat away), and by lowering the temperature of reaction to favor a gas phase reaction to form alpha silicon nitride; and (c) the requirements for effective hot pressing to full density are reduced with respect to temperature, pressure, time, and pressing aids needed.

A preferred method for making a hot pressed silicon nitride body by use of a low density reaction bonded body according to this invention is as follows.

A. MAKING A NITRIDED BODY OF LOW DENSITY

1. Mixing

A mixture of powder silicon, $SiO_2$ as an oxide film on the silicon powder, and at least one reactive oxygen carrying agent, is prepared. The reactive oxygen carrying agent is defined herein to mean a powder ingredient that is effective to form second phase crystallites, particularly oxynitrides, and/or appropriate silicates, when reacted with the silicon under a heated nitrogen atmosphere. The oxygen carrying agents can be advantageously selected from the group consisting of $Y_2O_3$, $Al_2O_3$, $MgO$, $CeO_2$, $ZrO_2$, $HfO_2$, as well as other rare earths.

For purposes of the preferred method, a uniform powder mixture is prepared with 2000 grams of silicon (86.6 weight percent of the mixture), 278 grams of $Y_2O_3$ (12 weight percent of the mixture and 13.9% of the silicon), and 32 grams of $Al_2O_3$ (1.4 weight percent of the mixture and 1.6 weight percent of the silicon). The usable range for the oxygen carrying agents is 0.4–2.3 molar percent of the mixture, and 0.42–2.4 molar percent of the silicon.

The normal permitted impurities and particle sizes is detailed further in copending U.S. application Ser. No. 525,498, now U.S. Pat. No. 4,508,671 the disclosure of which is incorporated herein by reference.

2. Milling

The mixture is comminuted and blended by being charged into an inert milling jar along with grinding media in the form of Burundum cylinders (85% $Al_2O_3$, 11% $SiO_2$, 2% $MgO$, 1.2% $CaO$, 0.8% of the combination of $TiO_2$, $Fe_2O_3$, $Na_2O$ and $K_2O$). The mixture is milled for a period of about 48 hours at 64 rpm and then separated from the media by use of a #10 mesh screen. This milling is carried out dry. The resulting milled mixture will have at least 50% thereof with an average particle size of about 4 microns and 90% with a maximum particle size of less than 23 microns.

3. Loading Powder Supply Into Furnace

The milled mixture is then poured onto a generally flat refractory plate to be used as a carrier into the furnace. The plate may have a rim of sufficient height only to prevent the material from spilling over the edge of the plate. The powder is distributed generally uniformly across the plate to have a thickness in the range of 1–2 inches. Other forms of carriers may be employed to transfer the powder in a desired configuration to the heating furnace. For example, refractory type furnace furniture in the form of cylinders or cubicles may be employed, or other polygons having a general cross-sectional configuration similar to that which is desired in the final product. The furnace furniture is designed so that the powder may be poured thereinto, contained and supported, but not compacted. The density of the loose, uncompacted powder on such carrier or furnace furniture can be in the range of 0.4–1.2 $gm/cm^3$, preferably less than 1.0 $gm/cm^3$. The green density will be a function of the particle size and particle size distribution of the silicon powder. Thus, for example, with a silicon powder supply having a maximum particle size no greater than 10 microns, the density will be about 0.75 $gm/cm^3$. With a maximum particle size criteria of 4 microns, the loose density will be about 0.50 $gm/cm^3$.

4. Heating to Nitride

The loose mixture is then heated in a nitriding atmosphere without the use of pressure normally associated with hot pressing to produce a silicon nitride comprising body. The furnace is preferably evacuated to a pressure of less than one micron and heated at a fast rate, i.e., 500° F./hr. (270° C./hr.) to 1200° F. (649° C.). The furnace is then filled with a gaseous mixture consisting of 72% by weight nitrogen, 3% hydrogen, and 25% helium, at a pressure of about 2.7 psig. The temperature of the furnace is then increased in steps to nitriding temperatures of 2000°–2500° F. (1093°–1371° C.) with the ultimate preferably not exceeding 2500° F. (1371° C.). The temperature is held constant thereafter. Fresh nitrogen is intermittently supplied to the furnace to replace the nitrogen consumed in the forming of the silicon nitride. Any conventional nitriding sequence may be employed, such as depicted in U.S. Pat. No. 4,235,857 (11/25/80 to J. A. Mangels), or in copending U.S. Ser. No. 528,228, now U.S. Pat. No. 4,477,402 the disclosures of which are incorporated herein by reference.

The nitriding sequence is carried out for a period of about 72 hours and in all cases no longer than 80 hours, which is more than half the normal time required for a nitriding sequence of silicon nitride which has been previously compacted. The use of a loose powder mixture during nitriding tends to control the normal exothermic reaction taking place between the silicon and nitrogen and calms such rapid exothermic reaction, preventing uncontrolled or localized melting of certain of the silicon particles. When the silicon particles are melted, they are unable to nitride properly and subsequently cause the formation of more undesirable beta silicon nitride. The formation of alpha silicon nitride is inhibited because the melted silicon particles are coalesced into a fluid bead which prevents the normal gas phase and diffusion nitriding processes from taking place.

The nitrided body will preferably consist of silicon nitride (at least 60% of which is in the alpha phase), 3–15% silicon yttrium oxynitrides, preferably in the $Y_1SiO_2N$ phase, and the remainder a small amount of a silicate glass.

B. HOT PRESSING

The nitriding body is then hot pressed to produce a silicon nitride comprising object of required dimension and density. A pressing fixture having graphite walls is normally used to carry out the hot pressing. The walls and nitrided body are both coated with a slurry of boron nitride and dried. The nitriding bodies are stacked within the cavity of the hot pressing fixture and may contain a series of as many as 10 to 12 stacked layers of nitrided bodies without any necessity for intermediate, rigid spacers therebetween. The heating and pressing is carried out preferably in increments:

(1) A mechanical loading of 100 psi is applied at room temperature to the body and such loading may be increased up to 2000 or 3000 psi if desired to agglomerate the sintered body.

(2) The temperature is then increased to 1800° F. (982° C.) and the pressure increased to considerably higher levels.

(3) The temperature is then increased to 2500° F. (1371° C.) and the pressure is simultaneously increased to 2500 psi.

(4) The temperature is finally increased to the hot pressing temperature of not over 3000° F. (1649° C.) and the pressure increased to 3700 psi, the latter conditions being maintained until at least 99% or desirably 99.5% of theoretical full density is achieved. This usually requires 0.25–2.0 hours at the hot pressing temperature. The object is then cooled at any rate, even quenched, to room temperature. The resulting object will consist essentially of beta silicon nitride and 2.9–14.4% by weight silicon oxynitrides and an appropriate protective silicate.

EXAMPLES

A series of three samples were prepared, each using the mixture proportions as indicated for the preferred embodiment wherein 2000 grams of silicon powder, 278 grams of $Y_2O_3$, and 32 grams of $Al_2O_3$ were mixed together. In the first sample, the mixture was ball milled and classified to have a maximum particle size of 24 microns causing the admixture to have a green density not over 1.2 gm/cm$^3$ when poured into or onto a furnace cradle. After conventional nitriding, as described in the preferred embodiment, the nitrided body had a density of not over 1.85 gm/cm$^3$. The nitriding cycle was carried out for a period of 72 hours.

Sample 2 was prepared as an admixture the same as in sample 1, except that the admixture was jet milled to have a maximum particle size of 10 microns and a loose, uncompacted density of 0.75 gm/cm$^3$. The nitrided density was 1.06 gm/cm$^3$ and the nitriding time was about 65 hours.

Sample 3 was similar to samples 1 and 2, except that the admixture was milled so that there was a maximum particle size no greater than 4 microns, resulting in a loose, uncompacted density for the powder of 0.55 gm/cm$^3$. The nitrided density was 0.85 gm/cm$^3$.

The same proportion for the admixture was employed for sample 4, but a compacting step was inserted, in accordance with the prior art, prior to the nitriding step. The milled powder was restricted to a maximum particle size of 24 microns and the compacted density of the admixture was 1.70 gm/cm$^3$. The nitriding was carried out so that the resulting nitrided density was 2.62 gm/cm$^3$.

Samples 1–3 exhibited an extremely short nitriding time, no greater than 80 hours as opposed to sample 4 which required 168 hours to provide full conversion of the silicon powder to silicon nitride. All of the samples were hot pressed with the same hot pressing sequence which involved heating to 1600° C. and holding for a period of about 30 minutes under pressures described for the preferred embodiment. Samples 1–3 exhibited density values that were in excess of 99.5% of full theoretical, whereas sample 4 exhibited a density value of 97.5% of full theoretical. In addition, sample 4 exhibited certain unreacted silicon flaws in the final hot pressed object. If the material from sample 4 were to be employed in a cutting tool, the ultimate cutting tool surface would be restricted because of its relatively low density and the presence of such flaws. Of course, the cost of producing the material of sample 4 is increased over that of samples 1–3 because of cold compaction, extended nitriding time, and required hot pressing conditions to reach 99.5% or greater of full theoretical density.

I claim:
1. A method of manufacturing a silicon nitride comprising object by the steps of:
    (a) heating an uncompacted quantity of a mixture of powdered silicon and a fluxing agent for aiding the pressure sintering of the mixture, said mixture having an increased pore network to increase the inward migration of the atmosphere and having an increased surface area exposed to the atmosphere to decrease the nitriding diffusion distance, said heating being carried out in a nitriding atmosphere without the use of pressure normally associated with hot pressing to fully react said mixture with said atmosphere to form a silicon nitride comprising body of dimensions greater than the required finished product and of density less the required finished product; and
    (b) mechanically hot pressing said silicon nitride body to produce a silicon nitride comprising product of the required dimensions and the required density, the product being useful as a cutting tool material for machining metals.

2. The method as in claim 1, in which said pore network is sufficient to increase the flow of gases therethrough, carrying heat away and controlling the exothermic reaction of said atmosphere and mixture to favor the formation of gas phase alpha silicon nitride with the total amount of alpha silicon nitride to be at least 60% of said mixture.

3. The method as in claim 1, in which said mixture of/uncompacted quantity of silicon and fluxing agent is distributed on a plate having a rim to prevent the spilling of said loose supply thereover, the mixture being generally uniform in thickness across said plate.

4. The method as in claim 1, in which said increased pore network is sufficient to compensate for internal volume expansion during nitriding without adversely affecting the increase in inward gas migration and nitriding diffusion distance.

5. The method as in claim 2, in which the higher content of gas phase alpha silicon nitride permits hot pressing to be carried out at a temperature no greater than 1650° C. and at reduced pressures and time.

6. The method as in claim 1, in which said uncompacted quantity of silicon and fluxing agent are introduced to a furnace cradle to support the loose supply of powder during the heating step, said cradle having a lateral interior configuration shaped as the desired configuration of the finished product.

7. The method as in claim 3, in which the thickness of said mixture supply is in the range of 1–2 inches.

8. The method as in claim 1, in which the density of said loose powder supply prior to heating is less than 1.2 gm/cm$^3$.

9. A method of making a silicon nitride comprising object by the steps of:
    (a) heating an uncompacted mixture of silicon powder and oxygen carrying agents in the form of yttria powder and alumina powder, said mixture having a green density no greater than 1.0 gm/cm$^3$, said heating being carried out in a nitriding atmosphere, without the use of pressure normally associated with hot pressing, to fully react said mixture with said atmosphere to form a silicon nitride comprising body of dimensions greater than the required finished product and of a density less than the required finished product; and (b) hot pressing said silicon nitride body to produce a silicon nitride comprising product of the required dimensions and the required density, the product being useful as a cutting tool material for machining metals.

10. The method as in claim 9, in which said oxygen carrying agents are present in said mixture in a molar percent of silicon in the range of 0.4–2.4.

11. The method as in claim 9, in which the period for carrying out said heating is equal to or less than 80 hours at a nitriding temperature level of less than 2550° F.

12. The method as in claim 9, in which the density of said nitrided body is in the range of 0.65–1.85 gm/cm$^3$.

* * * * *